United States Patent [19]

Bixby

[11] 4,180,832

[45] Dec. 25, 1979

[54] VIDEO RECORDING AND REPRODUCING APPARATUS HAVING VARIABLE REPRODUCTION SPEEDS

[75] Inventor: James A. Bixby, San Diego, Calif.

[73] Assignee: Eastman Technology, Inc., Rochester, N.Y.

[21] Appl. No.: 880,674

[22] Filed: Feb. 23, 1978

[51] Int. Cl.² .................... H04N 5/78; G11B 5/012; G11B 21/08
[52] U.S. Cl. .................... 360/10; 358/128; 360/106; 360/38
[58] Field of Search .................... 360/10, 38, 61, 86, 360/64, 47; 358/128; 179/100.3 V

[56] References Cited

U.S. PATENT DOCUMENTS

| | | | |
|---|---|---|---|
| 2,628,346 | 2/1953 | Burkhart | 360/47 |
| 3,509,274 | 4/1970 | Kihara | 360/10 |
| 3,631,426 | 12/1971 | Appelt | 360/47 |
| 3,732,362 | 5/1973 | Kinjo | 360/10 |
| 3,761,903 | 9/1973 | Bird, Jr. et al. | 360/47 |
| 3,911,483 | 10/1975 | Kihara et al. | 360/77 |

FOREIGN PATENT DOCUMENTS 46-42846 12/1971 Japan.

Primary Examiner—Bernard Konick
Assistant Examiner—Donald McElheny, Jr.
Attorney, Agent, or Firm—Robert F. Cody

[57] ABSTRACT

A video recording and reproducing apparatus utilizes a specialized head assembly which is arranged to be driven in a radial direction relative to a rotating magnetic recording disc. A spiral track is recorded on the disc and the specialized head assembly employs two discrete individual heads which are proximately aligned. The signals produced by each head are utilized in producing the final output signal. During playback, "scene motion speed" depends upon the speed at which the head is moved in a radial direction relative to the recorded disc and on the manner in which the output signals from the two heads are operated on.

16 Claims, 8 Drawing Figures

FIG. 3
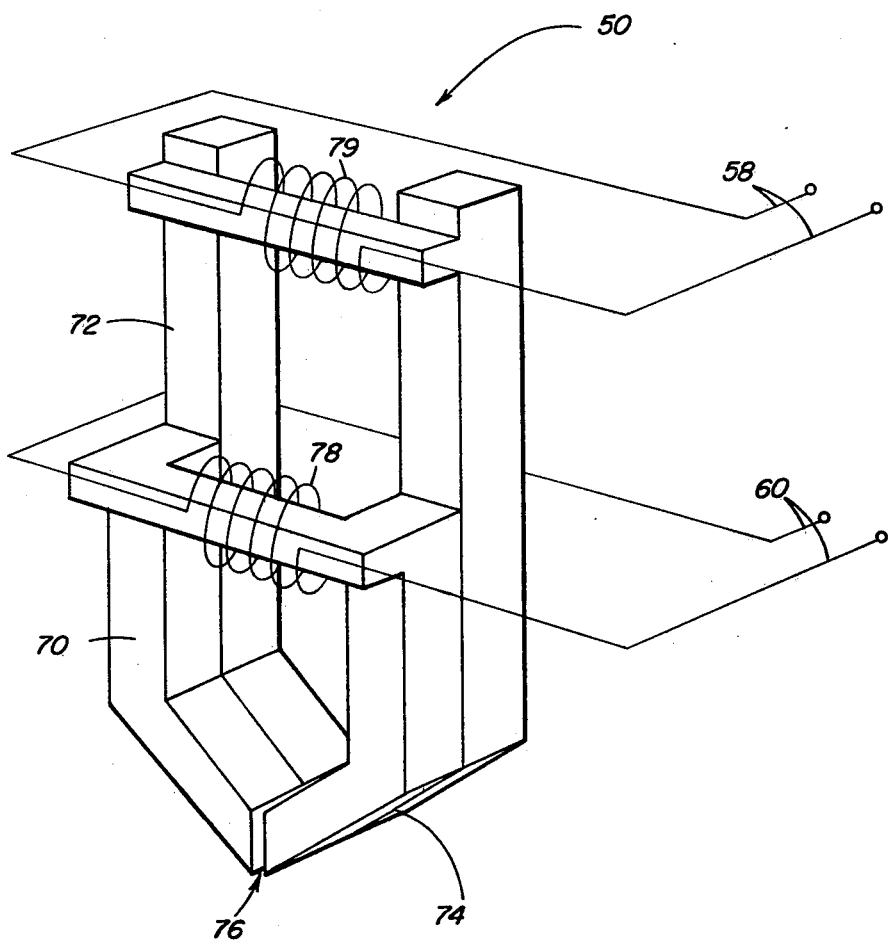
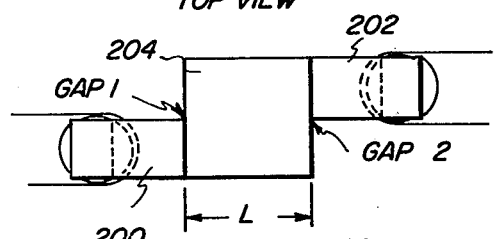
FIG. 7a
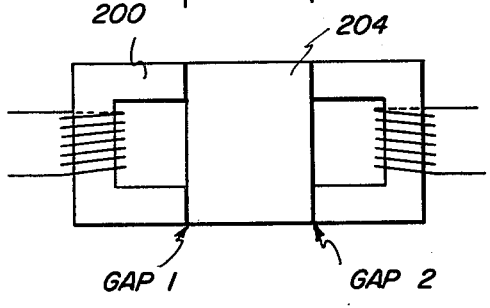
FIG. 7b

FIG. 5
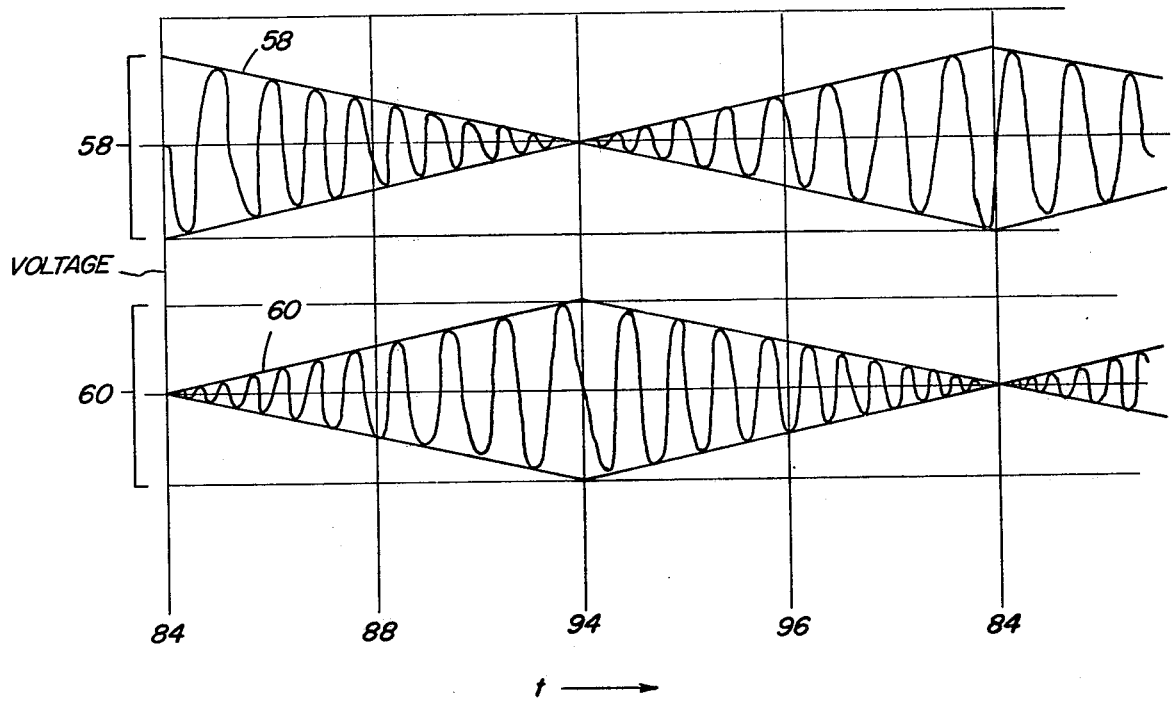
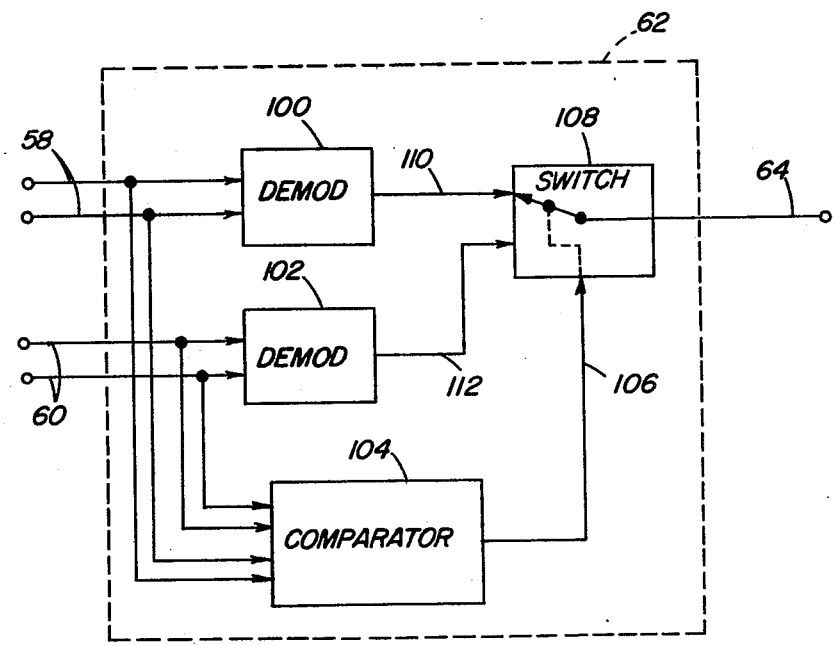
FIG. 6

VIDEO RECORDING AND REPRODUCING APPARATUS HAVING VARIABLE REPRODUCTION SPEEDS

BACKGROUND OF THE INVENTION

The present invention relates to recording and reproducing video signals on a magnetic disc and, more particularly, relates to a specialized system for use in varying the speed of motion within a display produced from such signals.

There have been many systems proposed for playback of variable speed video information. One such system currently in use employs a rigid metallic disc having a suitable magnetic surface applied to both sides. A magnetic head is located relative to each surface and special actuators accurately control the radial positioning of the two heads with respect to the disc. Magnetic discs of the type under discussion are relatively difficult to manufacture, since they require an extremely fine surface finish. In contrast, plastic discs, which are used for computer memory storage and the like, and which are called floppy discs, have not, in general, been used with video recorders since the tolerances of such floppy discs are insufficiently controlled. Typically, the system in question utilizes a recording head arrangement which records video frame information in concentric circles on the record media and, as discussed above, records on both sides of the record media.

Other known video recording systems record video frames, serially and spirally, on one side of a record disc. In order for such systems to reproduce recorded video signals so as to effect slow motion, stop motion, or speeded-up motion, complex electronic apparatus is necessary.

SUMMARY OF THE INVENTION

The present invention employs apparatus for recording a video signal on one side of a magnetic disc. The video signal is recorded in the form of a spiral magnetic track on the disc. The angular velocity of the disc is such that one frame of video signal is recorded on the disc within exactly one revolution of the disc, i.e., a single video frame is recorded on each turn or coil of the spiral. During the recording operation, a specialized record/reproduce head assembly is caused to move with a constant velocity along a radius of the magnetic disc, the disc being driven at a constant angular velocity. The recording head is so driven at a rate in the radial direction that a guard band or dead space will spirally appear on the disc adjacent the video signal as it is being recorded.

The specialized head assembly is utilized in the reproduction of the recorded video signal for replay at various scene-motion speeds. The head assembly comprises two discrete magnetic heads of equal width which are aligned in proximity and which are electrically and magnetically isolated from each other. By radially driving the head assembly during signal playback at the same velocity which was employed while the video signal was recorded, apparatus employing the present invention—with proper head selection—reproduces the exact signal which was recorded. By causing the head assembly to move radially at a velocity which is different than that utilized in the recording operation, the discrete head which was used to make the original recording will not always fully follow the spiral track, since it will at times be in registry with either the adjacent spiral recorded track or one of the guard bands. However, because of the inventive head assembly, the second discrete magnetic head, which is accurately and closely aligned with the first head, will at times follow the track containing the frame which is desired to be reproduced. A specialized electronic circuit is provided by the present invention to receive the signals from both of the discrete heads of the inventive head assembly and to select one or the other of the two signals. In this way, the present invention serves to reproduce one frame of video signal information, whether or not the original record head is in constant registration with the recorded spiral track. In other words, the two-head assembly provided by the present invention assures that a signal will be produced at all times, regardless of the location of the first recording head in relation to the spiral guard band. A feature of the present invention is the recognition that by recording a single video frame within a single revolution of the disc, the differences between the informational contents of successive frames is minute and relatively inconsequential. Typically, video frames occur at the rate of 30 per second. Therefore, the novel two-head assembly can detect signals from adjacent bands and reproduce such signals as if the signals were being derived from only the signal band representing the frame of interest.

For example, in the event that it is desired to reproduce a previously recorded video signal in a slow motion fashion, the inventive head assembly will be driven in the radial direction along the magnetic disc at a rate which is slower than that utilized in the recording operation. Therefore, the first magnetic head in the head assembly will not always be in registration with the spiral track, which it originally recorded. This is because the track is a spiral and the head is not being driven at the same pitch at which the track was recorded. However, since the information content of adjacent frames is substantially identical and, since each revolution of the disc corresponds to a single frame, the second magnetic head in the head assembly will also produce signals from the track adjacent to the track of interest. All of the reproduced signals will be fed to the specialized circuit arrangement which selects the actual output signals for transmission to the video reconstruction apparatus.

Accordingly, it is an object of the present invention to provide video recording apparatus that is capable of reproducing the recorded scene information at speeds different than the recording speed.

It is another object of the present invention to provide a video recording system for magnetically recording a signal on a disc in a special fashion having a spiral guard band adjacent thereto, wherein a single video frame is recorded with each revolution of the disc.

It is still another object of the present invention to provide a relatively simple and inexpensive apparatus for reproducing a recorded video signal at various frame speeds.

BRIEF DESCRIPTION OF THE DRAWINGS

FIG. 3 is a perspective view of the inventive head assembly provided by the present invention;

FIG. 5 is a diagram showing the output signals of the two identical magnetic head portions of the inventive head assembly;

FIG. 6 is a schematic diagram of the signal discriminator provided by the present invention; and FIGS. 7a, 7b depict top and side views of a presently preferred head for use in practicing the invention.

DETAILED DESCRIPTION OF THE PREFERRED EMBODIMENT

Figure 1:
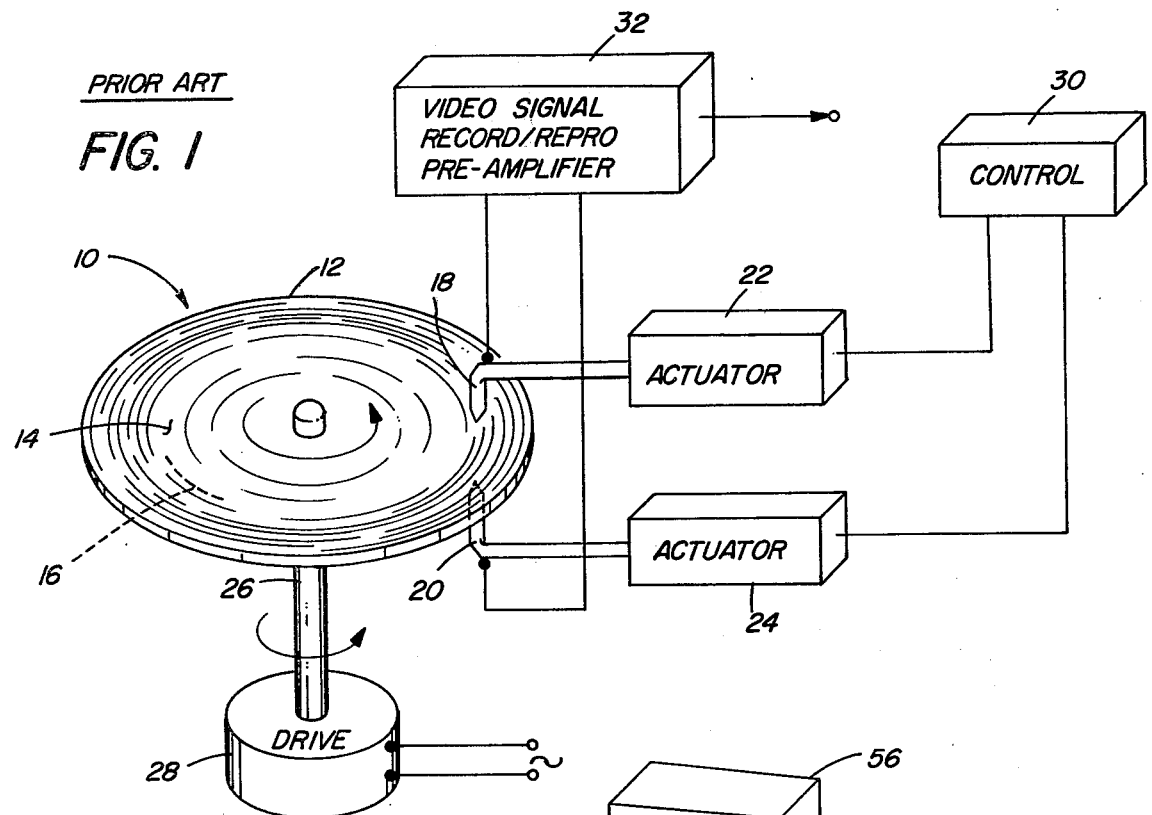
FIG. 1 is a block diagram, partially schematic, of a prior art video recording system.

Referring to FIG. 1, a typical prior art video recorder system 10 having variable scene reproduction speeds is shown. A rotatable disc 12 having a magnetic recording surface applied to each side 14, 16 is employed by this system. Magnetic record and reproduction heads 18, 20 are provided on either side of the rotating disc 12 for interaction with the magnetic surfaces 14, 16, respectively. Actuator assemblies 22, 24 are provided to control the radial positions of the magnetic heads 18, 20. The video recording system 10 operates in the following manner: When it is desired to record a video signal on the magnetic disc, an actuator 22 positions, say, the head 18 with respect to the surface 14 of the rotating disc 12 and a single video frame is recorded during one complete revolution of the disc 12. Rotation of the disc 12 is accomplished by means of a drive shaft 26 and a suitable drive motor 28. The drive motor 28 is a synchronous motor or the like in order to assure that the rotational speed of the disc 12 will be accurately controlled. The rotational speed is chosen in conjunction with the frame (or field) repetition rate so that one frame (or field) of the video signal will be recorded during one revolution of the disc 12. While the head 18 records one frame, the actuator 24 accurately positions the magnetic head 20 with respect to the surface 16 of the rotating disc 12, thereby to record, say, the odd numbered frames on the disc surface 14 and the even numbered frames on the disc surface 16. In other words, the actuator 22 repositions the head 18 with respect to the surface 14 while the head 20 effects its recording. The sequential control of the respective actuators may be provided by a suitable control circuit 30, which may be quite complex, depending upon the operating specifications of the particular system 10.

Assuming that the disc 12 has had the successive concentric tracks applied to both sides 14, 16 by the operation of the recording heads 18, 20 and the actuators 22, 24, as described above, in order to provide stop motion reproduction, the appropriate head is accurately positioned by its actuator and held stationary over the desired track. The information contained in that track which relates to a single frame of the video information is then repetitively reproduced by the head with each revolution of the disc 12, and is fed to a video signal recording and reproduction preamplifier 32 for purposes of visual reproduction.

Continuing with the above example, in relation to the system 10 of FIG. 1, in order to produce slow motion reproduction, each track is reproduced in an alternating repetitive pattern; however, the alternating between heads is at a different rate than that utilized in the recording operation. In other words, the control unit 30 is employed to energize sequentially the actuators 22, 24 (during vertical blanking periods) to advance the heads 18, 20 at a slower rate than would be used in normal reproduction. For example, each head 18, 20 may be held in a single position for three successive rotations of the disc 12, before being advanced.

Accordingly, from FIG. 1 and the above discussion, it may be seen that the actuators 22, 24 are called upon to provide a high degree of accuracy in relation to the head location. The actuators must also be accurately controlled by a suitable control means in order to provide the desired scene motion from the reproduced signal.

Figure 2:
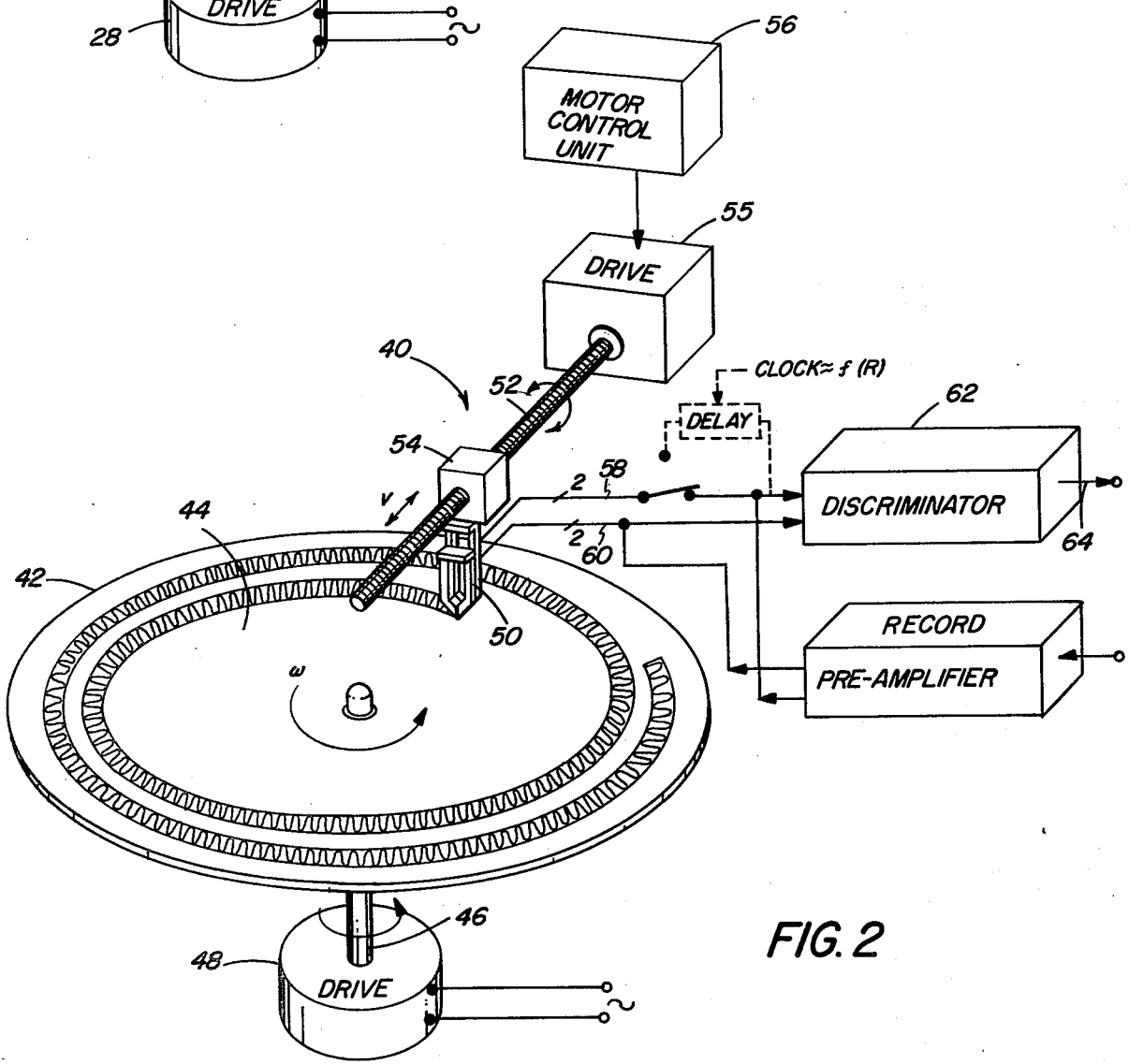
FIG. 2 is a block diagram, partially schematic, of the recording and reproducing apparatus provided by the present invention.

FIG. 2 is a pictorial view, partially schematic, of the recording and reproducing apparatus 40 of the present invention. A disc 42 is provided with a magnetic coating on only one surface 44 and is arranged to be rotated by a shaft 46 of a drive motor 48 at a rate of angular rotation $\omega$ to permit the recordation of one frame of video signal information each revolution of the disc 42. The specialized head assembly 50 provided by the present invention is affixed to and driven by, a lead screw 52 and threaded nut, or the like, 54. The lead screw 52 is arranged so that the head 50 will be driven linearly and radially relative to the disc 42. By simultaneously driving the lead screw 52, and rotating the disc, the head 50 traces out a spiral shaped path. The lead screw 52 is so driven at an angular rate that the spiral path or track has a dead space or guard band arranged between successive spirals of the recorded track of a preferred dimension, i.e., the guard band is so sized that the record track width and the guard band width are both equal. It is noted that this is not a requirement for the operation of the present invention, and in fact the guard band may typically be as small as one-half the track width. The drive of the lead screw 52 is accomplished by a suitable motor 55, or the like, under the control of a motor control unit 56.

Video signals are fed both to and from the duplex head assembly 50 on two pairs of lines 58, 60. During playback a discriminator unit 62, which—as will be described below—selects portions of the reproduced signals, places playback signals on line 64, where they are fed to a conventional system for visual reproduction.

Referring to FIG. 3, the duplex record and reproduce head assembly 50 of FIG. 2 is shown in more detail. The head assembly 50 consists of two separate individual core assemblies 70, 72, which are closely aligned and abutted one against the other. The separate core assemblies 70, 72 are electrically and magnetically isolated from each other by means of a layer 74, of one of the well-known magnetic flux impermeable materials, separating the two core assemblies. (It will be appreciated that the shield 74 must be reasonably thick and that, therefore, the head assembly under discussion is contemplated for a large geometry system. A presently preferred head assembly embodiment useful in a small geometry system is discussed in connection with FIGS. 7a and 7b.) The gaps 76 in each head are closely aligned and the width or thickness of each core is identical. This exact correlation in the widths of the separate cores 70, 72 is an important feature of the present invention, which will become more apparent in the following description. Each core 70, 72 is provided with its own electrical winding 78, 79, respectively. The input and output signals for the cores 70, 72, as indicated in FIG. 2, are sent on dual lines 58, 60, respectively. In arranging the duplex head assembly 50 in the system 40 of FIG. 2, it is noted that the gaps 76 must be radially aligned with the record disc. Because in the preferred embodiment the signals which are to be recorded and reproduced are intended to be modulated by use of frequency modulation techniques, the design parameters relative to the duplex head assembly 50 are chosen to optimally record and reproduce signals in the frequency band required by the modulation of the FM carrier by the video signal information. Of course, each core 70, 72 is individually capable of both recording and reproducing video signals.

As discussed above, in relation to FIG. 2, the duplex head assembly 50 cooperates with the surfaces of a magnetically coated disc to record and reproduce a frequency modulated video signal. The recording process might typically take place as follows: One of the cores 70, 72 is driven with the frequency modulated video signal which is desired to be recorded. The head assembly 50 is continuously moved with a velocity $v$ along a radius of the rotating magnetic disc by means of the lead screw 52. As this is taking place, the magnetic disc 42 is being rotated with an angular velocity given by $\omega$. The angular velocity is chosen so that one frame of frequency modulated video information will be recorded during a single revolution of the magnetic disc 42. Under the conditions described above, the video signal will be recorded upon the magnetic disc as a spiral, as may be seen in FIG. 2, and having a track width which is equal to the width of the core 70 or 72. As stated above, both heads are of identical width, although this is not a requirement for practicing the present invention. These spiral tracks will continue to be laid down upon the magnetic surface 44 of the rotating disc 42 until the entire disc surface (or a part thereof) has been covered with a spiral track, continuously separated upon each revolution by a nonrecorded guard band. Having described the manner in which the video signal information is recorded upon the magnetic disc, the reproduction which may be achieved at different scene-motions will now be described.

Figure 4:
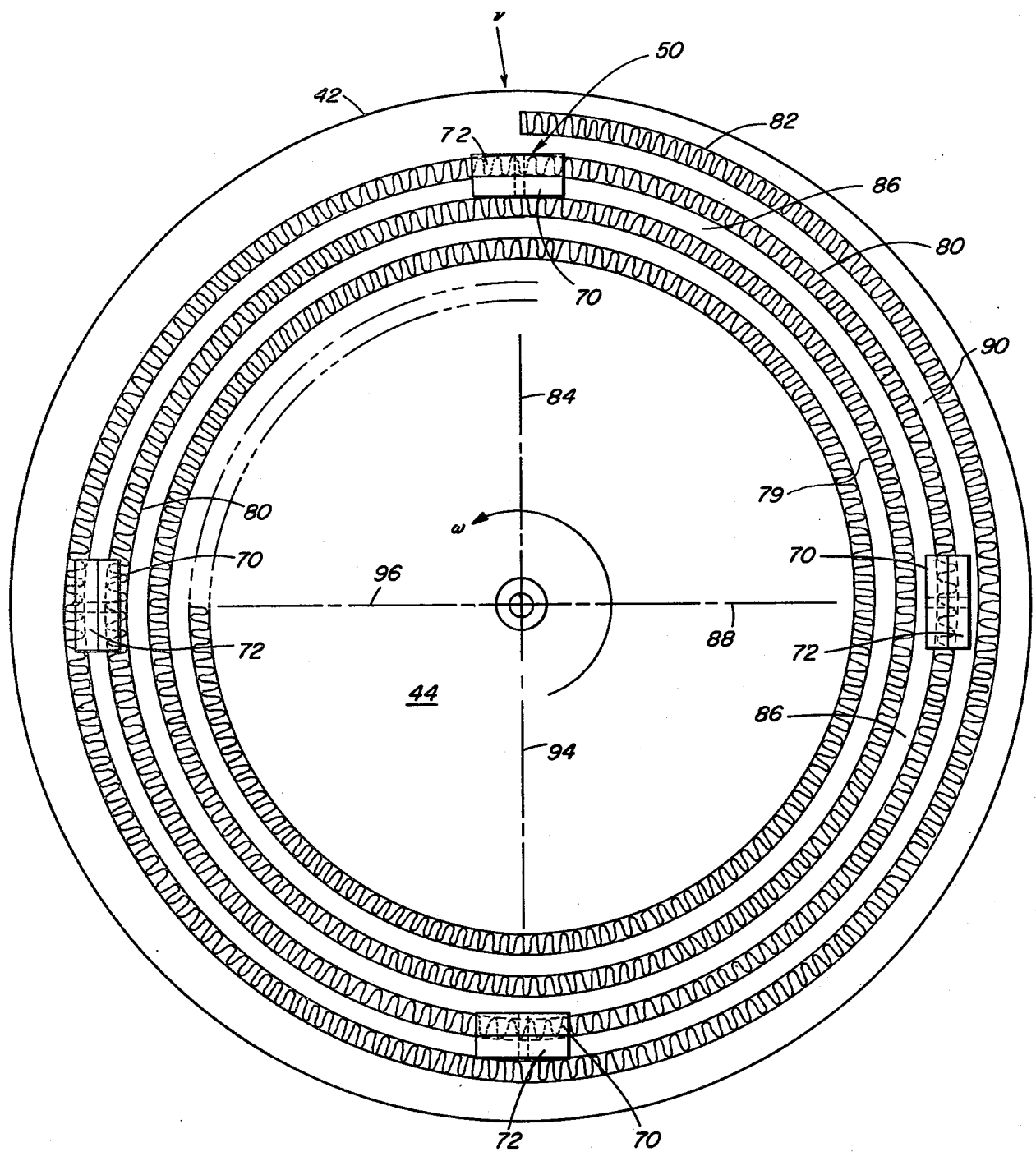
FIG. 4 is a schematic representation showing the location of the inventive head assembly in relation to the recorded video signal track on the disc.

In FIG. 4, the magnetic disc 42 is shown having already recorded thereon a continuous spiral track and having an adjacent guard band. The recorded track contains, say, a frequency modulated video signal with one frame being recorded within one revolution of the disc 42, in accordance with the teaching of the present invention. In this example, a single video frame has been recorded upon the disc as a track shown at 80 by the head assembly 50 moving with a radial motion with respect to the disc. By aligning one of the head cores with track 80 and causing the head assembly 50 to be driven with a radial velocity equal to $v$, the original video signal may be reproduced by core 72 with no time expansion or compression of the reproduced scene information. When head assembly 50 is driven with the recording velocity $v$ and core 72 is utilized as the reproduction means, the other core 70 will be in continuous registry with the guard band and no signals will be produced by this core. When it is desired to produce stopmotion, i.e., freeze a particular video frame, the present invention may be utilized as follows: The head assembly 50 is positioned over the track containing the frame of interest, with one of the cores, for example 72, positioned in registry with the track segment of the frame to be reproduced and, in the example of FIG. 4, this is represented as track 80. The video signal corresponding to the preceding frame is indicated in a similar manner on the outermost track 82. The stop motion reproduction is accomplished by reading frame information in a repetitive manner; however, this poses a difficulty since the track is not circular and the head assembly 50 is held stationary, i.e., $v$ equals zero. In all cases, the disc is continuously rotated at the normal constant angular velocity $\omega$.

In operation, the head assembly 50 is held steady along a radial line 84 corresponding roughly to the beginning of the frame. It is understood that, since the head assembly 50 is stationary and the track 80 is a spiral, as the disc 42 is rotated the track will come into registry with the head 72 and move out of registry with the head 72 as may be expected from FIG. 2. In order to show and explain the present invention more clearly by means of FIG. 4, however, the head assembly 50 is shown as having been 'rotated' while the disc 42 is held stationary. This provides, of course, the same relative motion between the head assembly 50 and the recorded track 80. Accordingly, along radius 84, core 72 intercepts track 80 and the second core 70 intercepts the guard band 86; hence signals will only be produced on lines 58 (FIG. 2). As the disc 42 moves, or in the present example, as the head assembly 50 is 'rotated' to be in alignment with radius 88, it is seen that the recorded track 80 moves out of registry with the first core 72 and moves partially into registry with the second or inner core 70. The core 72 is now in partial registry with the spiral guard band 90 between the track 82 and track 80, and the core 70 is now only in partial registry with the spiral guard band 86 between track 80 and the track 79. Accordingly, signals will be produced on both pairs of lines 58, 60 (FIG. 2). Upon further revolution of the disc 42 or, in the present example, by moving the head 50 relative to the disc 42, the head assembly 50 is aligned along radius 94. It is seen that the core 72 is now located in registry with the guard band 90 and the other head 70 is now in full registry with the track of interest 80. Accordingly, no signal will be produced by core 72 while the entire frequency modulated signal will be detected and reproduced by head 70. As the relative rotation continues and the head assembly becomes aligned along radius 96, it is seen that the core 72 is now in partial registry with track 80 and with part of the guard band 90 separating track 80 and track 82. Similarly, head 70 is in partial registry with the guard band 90 and with the frame of interest 80. This is because the track 80 has a decreasing radius and is, in fact, spiralling inwardly away from stationary head 72 and the recorded track 82, which in its inward motion relative to the stationary head assembly 50 will now begin to intercept the core 72. As the rotation approaches $2\pi$ radians, the video information reproduced by core 72 corresponds to the tail-end of the frame recorded in track 82, the core portion 70 again going totally into registry with the guard band 86. This is seen when the head assembly is once again positioned along radius 84.

The present invention provides apparatus to achieve stop action since, as discussed above, exactly one frame of the video signal has been recorded during only a single revolution of the disc. It is noted that in typical video systems, the frame repetition rate is 30 frames per second and, hence, the information on adjacent tracks, e.g., tracks 80, 82 will be almost identical. The present invention recognizes this situation and exploits it by providing a duplex head assembly wherein the two head portions have identical widths or active areas presented to the recording media. By having identical working areas, the signals produced by either head are then normalized to each other and, by applying the teaching of the present invention, portions of each signal may be selected to produce a final video signal closely approaching the signal corresponding to the particular frame desired. The present invention provides apparatus to utilize (1) this correlation between frames and (2) the fact that the head portions have identical working areas to generate a stop action, slow motion, or fast action signal by means of specialized circuitry, which will be shown in more detail in FIG. 6.

Referring first, however, to FIG. 5, a diagram of the signal output of the head assembly 50 is shown relative to the various radial positions of FIG. 4. Signal strength variations in the signals provided by cores 70, 72 are present because, as the disc rotates and the head assembly 50 is maintained stationary, each core intercepts or moves into registry with differing amounts of the recorded track. FIG. 5 shows the signal output on lines 58 from core 72 and the signal output on lines 60 from the core 70 at the seccessive radial locations 84, 88, 94, 96, as shown in FIG. 4. More specifically, it may be seen that when the head assembly 50 is aligned along radius 84 the core 72 produces the entire signal on lines 58 and, since core 70 is over guard band 86, no signal will be produced on lines 60. As rotation progresses, the principal track of interest 80 moves inwardly, coming in registry with head 70 and producing an output signal on lines 60, as shown in radius 88 in FIG. 5. As the rotation continues and the head assembly 50 is aligned along radius 94, since track 80 is spiralling inwardly, the track 80 is now in total registry with the core 70 and core 72 is now in total registry with the guard band 90. Therefore, all of the reproduced signal will be on lines 60 and will be derived by head 70 from track 80. Since the track 80 is continuing to spiral inwardly, as had the previously recorded track, core 72 now registers with part of the guard band 90 and with part of the inwardly spiralling, previously recorded, track 82. Similarly, core 70 will register with the track 80 and the guard band 90. Therefore, both heads 70, 72 will produce a signal representing a frequency modulated video frame although not the same video frame. It should be noted that since the signals have been recorded upon the disc in a frequency modulated manner, the variations in amplitude provided by the spiralling track and the stationary head merely relate to signal strength and do not detract from or affect the frequency modulated video information contained in the modulated signal. Therefore, no video frame information is lost in the stop motion operation provided by the present invention.

In FIG. 6, the specialized circuitry which permits the present invention to discriminate between the signals detected from adjacent tracks is shown in more detail. The circuit of FIG. 6 provides a continuous monitor of the output signals from duplex core assembly 50 and serves to detect the relative amplitudes of the outputs from each of the cores 70, 72. The output signals from core 70 are fed into an FM demodulator 100 on lines 58 and the output signals from core 72 are fed into a second FM demodulator 102 on lines 60. The output signals are also fed into a comparator circuit 104 which compares the relative amplitudes of the envelopes of the detected signals, as shown in FIG. 5, and produces an output signal which indicates which of the two input signals is of the larger amplitude. In the case of identical amplitudes, a flip-flop or multi-vibrator may be provided in the comparator circuit, so that the preceeding signal is maintained until the other signal exceeds it in amplitude. Alternately, the comparator may be biased slightly in favor of one or the other of the two signals. The comparator then produces an output signal on line 106 which is fed to a state of the art switch 108 which has as its input the demodulated signals on line 110 (core 70) and also the demodulated signals on line 112 (core 72). The information contained on line 106 serves to control switch 108 so as to feed through either the demodulated signal on line 110 or the demodulated signal on line 112 to the video reproduction output line 64.

As described above, the head assembly outputs from adjacent tracks are highly correlated data. Therefore, by selecting a part of the output from a desired frame or from a part of one of those adjacent frames, it is possible to provide a video signal with minimum degradation to the stop frame motion display. In other words, if the first half of a display frame is obtained from one frame, the second half of the frame may be obtained from the adjacent frame without serious degradation to the final signal.

Although the preferred embodiment, as described above, operates satisfactorily in an actual working system, it may be advantageous to perform the switching between heads by use of the switch 108 during the horizontal sync interval which is present in all video signals. This may be done in order to minimize introduction of any switching transients into the displayed image. This switching during selected intervals may be easily performed by utilizing a gate in conjunction with switch 108, which may be driven by the readily available horizontal sync pulses of the video signal.

Based upon the discussion relative to reproducing a stop motion of a video signal, it may be seen that by increasing the radial velocity $v$ of the duplex head assembly 50 during reproduction to a velocity above the value that was utilized in the recording operation, a fast-action or speeded-up motion will be produced, again utilizing the principal that the information on the adjacent spiral tracks correlates closely and by utilizing the specialized duplex head assembly. Similarly, slow motion may be obtained by driving the head assembly in a reproduction mode with a radial velocity less than that utilized in the recording operation. Moreover, an additional feature provided by the present invention is that the duplex head assembly may be radially driven in the reverse direction, thereby providing a reverse motion to the reproduced signal, again utilizing the basic principles as disclosed above.

It is understood, of course, that the foregoing discussion is given by way of example only and is not intended to limit the present invention to the specific embodiments disclosed. Many variations and constructions employing the present invention may be achieved. For example, for ease of explanation, it was assumed above that the duplex head assembly will be positioned with one of the two cores in direct registry with the desired track, i.e., that the core assembly would be centered directly over the track of interest. However, with the core in any position, for example in a stop-motion mode, it would detect and appropriately select the output from an adjacent track in order to provide the desired stop-motion display. Additionally, the comparator circuit 62 may embody various components in order to achieve the desired signal selection.

As indicated above, mutual isolation of the heads of the head assembly in a small geometry system may be a problem. To avoid such problem, the invention further provides that the head assembly be formed as in FIGS. 7a, 7b, showing, respectively, the top and side views of such an assembly. The head assembly of FIG. 7 comprises a pair of C-yokes 200, 202 and a common magnetic spacer 204. Because of the spacer 204 the gaps of the head assembly are mutually isolated. To nullify the effects of the time delay inherently between the head gaps of the assembly of FIG. 7, a suitable delay device may be associated with the appropriate lead (58 or 60) of FIG. 2. See dashed component 58'. Such a delay, which may be provided by a charge-coupled device with a variable clocking rate, will of course have its delay adjusted as a function of the lineal-speed-determining disc radius R.

What is claimed is:

1. A television video signal recording and reproduction system for use with a magnetic storage medium comprising first and second magnetic head means for recording said television signal on said storage medium and for reproducing said recording signal, means for rotating said storage medium at a rate such that one video image is recorded during one rotation of said storage medium, means for simultaneously moving said head means during recording relative to said storage medium such that said first head means records said video signal in a track formed as a continuous spiral on said storage medium and having a substantially unrecorded portion continuously adjacent said recorded track and for simultaneously moving both said head means during reproduction such that both said head means may register with different parts of said recorded track, whereby said head means reproduce discrete signals corresponding to those portions of said recorded track in registration therewith, and means connected to said head means for selecting portions of said signals to form therefrom an output signal representing said recorded television video signal.

2. The system of claim 1 wherein said first and second magnetic head means are substantially identical discrete magnetic head cores arranged adjacent one another and being electrically and magnetically isolated from each other.

3. The system of claim 2 wherein said means for moving said head means during recording and during reproduction is arranged to move said head means along a radius of said magnetic storage medium.

4. The system of claim 2 wherein the width of said unrecorded portion is substantially equal to the width of said recorded track.

5. The system of claim 1 wherein said means for moving said head means comprises a lead screw having said head means threadedly engaged thereon, and a motor for rotating said lead screw at a variable speed.

6. The system of claim 1 wherein said means for moving said head means during recording and during reproduction may be caused to stop movement of the head means in relation to the record during reproduction such that said head means is in cyclical registration with at least two adjacent recorded tracks.

7. The system of claim 1 wherein said means for selecting portions of said reproduced signals from said head means comprises comparator means having inputs connected to said reproduced signals for comparing the relative amplitudes thereof and producing a control signal indicating the higher amplitude.

8. A television video signal reproduction system for use with a rotary magnetic recording medium having recorded thereon a continuous spiral track containing video signals which are so recorded that signals corresponding to a full video field or frame are recorded per turn of the spiral track, the pitch of said spiral track being such that the recorded and unrecorded parts of medium are both spirals with substantially the same width radial dimensions, said reproduction system comprising: a magnetic head assembly having at least two discrete heads for producing respective output signals, said heads being so sized and disposed with respect to said medium that one head may coact substantially exclusively with said track while said other head coacts substantially exclusively with the unrecorded spiral of said medium, means for so selectively providing relative positioning between the heads of said head assembly that said heads may together selectively move radially toward the hub of said medium and together toward the periphery of said medium, and means connected to receive said output signals from the heads of said head assembly for producing a resultant video output signal representing selected portions of said output signals.

9. The system of claim 8 wherein said head assembly is comprised of two discrete heads of identical width and disposed side-by-side, said assembly being further comprised of means for electrically and magnetically isolating said heads from each other.

10. The system of claim 9 wherein said means for positioning said head assembly comprises lead screw means for positioning said heads and a motor arranged to drive said lead screw means.

11. The apparatus of claim 10 wherein said motor comprises a variable speed motor, whereby the radial motion of said heads relative to said record medium may be selectively stopped or the speed thereof increased or decreased.

12. The apparatus of claim 8 wherein said means for producing a resultant video output signal comprises comparator means connected to receive said output signals from said heads for producing a control signal corresponding to the stronger of its received signals, and switch means connected to receive said output signals from said heads and to receive said control signal, thereby to actuate said switch means to pass the stronger of its input signals.

13. A system for recording periodic signals and for reproducing the recorded signals comprising: a rotatable disc having at least one magnetic surface for recording thereon, a magnetic head assembly operable in a first mode to record said periodic signals on said disc and in a second mode to reproduce said signals, said head assembly being comprised of first and second heads, said signals to be recorded being applied to said first head, and said first and second heads having substantially identical track width dimensions, means for rotating said disc at a rate such that one period of said signal is recorded, during one rotation of said disc, by said first head operating in said first mode; positioning means for positioning said head assembly radially of said disc; variable rate drive means drivably engaged with said positioning means such that said head assembly may be moved at a preselected speed inwardly and outwardly along a radius of said disc, means operative in said first mode for moving said head assembly at such a speed that said periodic signal is recorded on said disc in the form of a continuous spiral track having an unrecorded portion continuously adjacent thereto, said adjacent portion and said track having widthwise dimensions which are such that one head can primarily coact with said track while said other head primarily can coact with said unrecorded portion, and discriminator means operative when said head assembly is in said mode and connected to receive the output signals produced by said first and second heads for producing an output signal representing the reproduced signal having the larger instantaneous amplitude.

14. The system of claim 13 wherein said first and second magnetic heads are arranged adjacent to each other, and wherein said system includes means for electrically and magnetically isolating said heads from each other.

15. The system of claim 14 wherein said discriminator means comprises a comparator connected to receive said output signals from said first and second magnetic heads for producing a control signal indicating which input signal has the greater amplitude, and switch means having first and second inputs respectively connected to receive said output signals from said heads and an input connected to receive said control signal for selectively causing the stronger of said input signals to appear at the output of said switch means.

16. The system of claim 13 wherein said positioning means comprises a lead screw.

* * * * *